United States Patent

[11] 3,584,669

| [72] | Inventor | Merritt S. Cooley<br>Davisburg, Mich. |
|---|---|---|
| [21] | Appl. No. | 790,210 |
| [22] | Filed | Jan. 10, 1969 |
| [45] | Patented | June 15, 1971 |
| [73] | Assignee | Merritt Manufacturing Co.<br>Pontiac, Mich. |

[54] HUB AND AXLE ASSEMBLY
6 Claims, 4 Drawing Figs.

[52] U.S. Cl. .............................................. 152/52,
301/1
[51] Int. Cl. .............................................. B60b 9/12
[50] Field of Search ........................................ 301/1;
152/40, 41, 47, 49, 50, 51, 7, 9, 52, 30

[56] References Cited
UNITED STATES PATENTS

| 331,068 | 11/1885 | Larzelere .................... | 152/51 |
| 1,259,541 | 3/1918 | McFerren .................... | 152/49 |
| 3,123,168 | 3/1964 | Atwood ....................... | 280/DIG. 7 |
| 3,425,475 | 2/1969 | Hoy ............................ | 152/9 |
| 502,406 | 8/1893 | Moebus ....................... | 152/52 |
| 3,237,675 | 3/1966 | Fisher ......................... | 152/397 |

*Primary Examiner*—Richard J. Johnson
*Attorney*—Barnard, McGlynn & Reising

ABSTRACT: A hub and axle assembly including a hub having a cylindrical opening with a transverse connector mounted therein and secured to the inner wall thereof. The end portion of an axle is received in the cylindrical opening and is nonrotatably secured to the connector. A plastic load-distributing and torque-transmitting member is received in the cylindrical opening and bonded to the inner wall thereof with an axial opening therein receiving the end portion of the axle. The axle and torque-transmitting member are secured together against relative rotation whereby torsional forces are transmitted between the axle and hub through the torque-transmitting member.

PATENTED JUN 15 1971  3,584,669
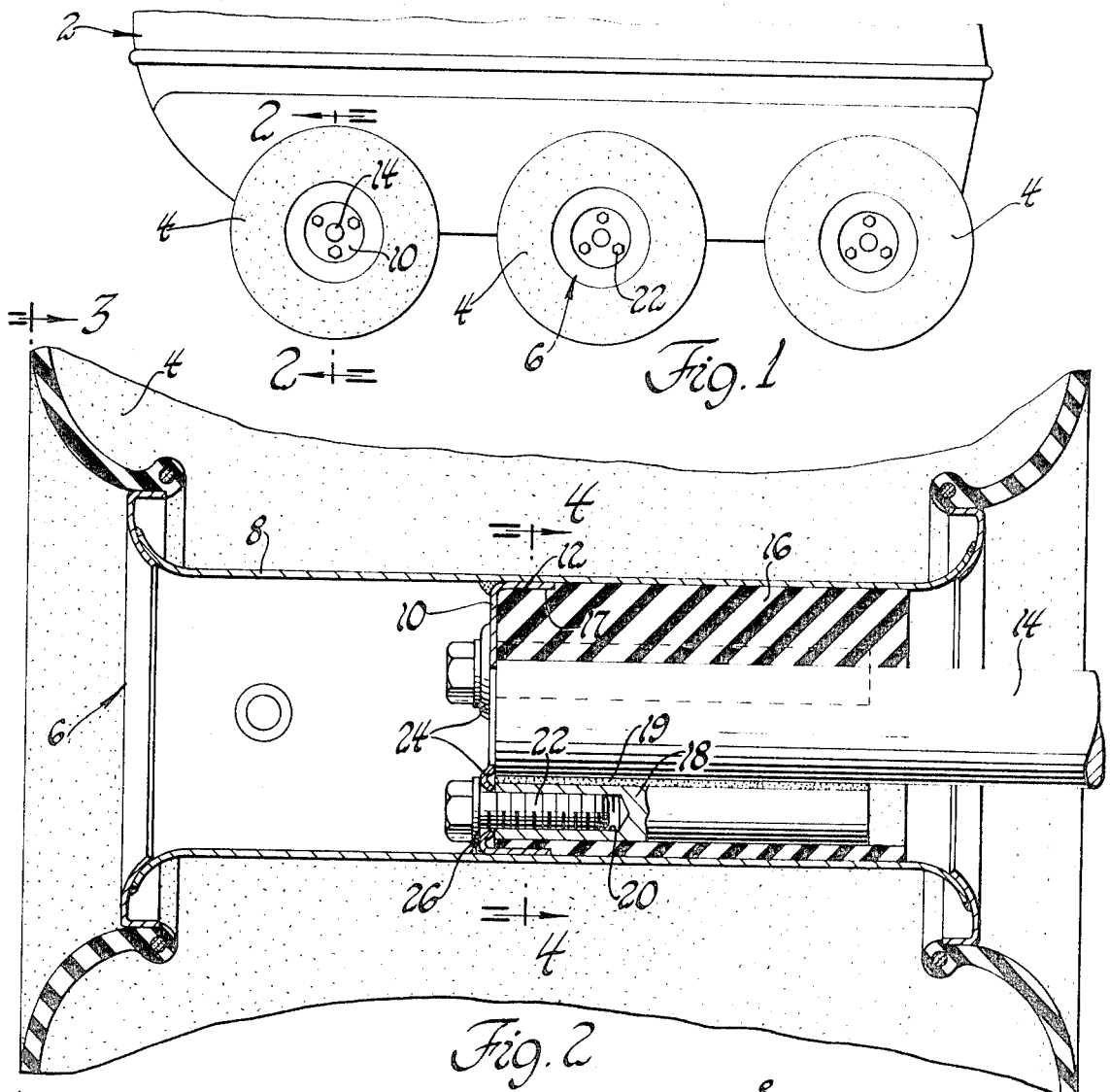
Fig.1
Fig.2
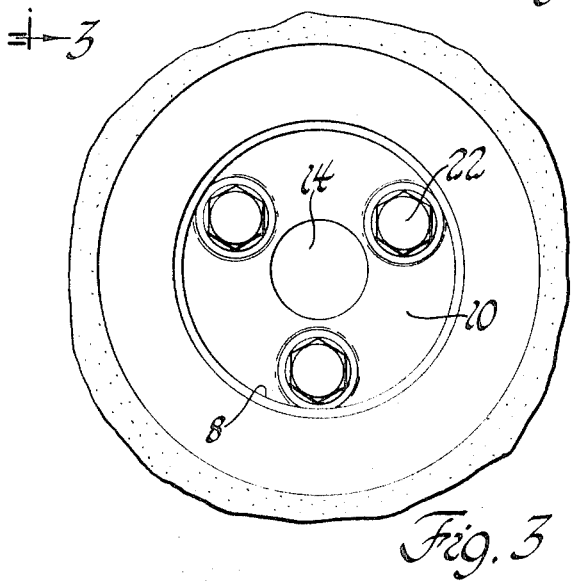
Fig.3
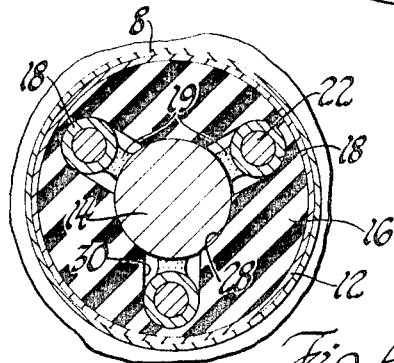
Fig.4
INVENTOR.
Merritt S. Cooley
BY
Barnard, McGlynn & Reising
ATTORNEYS

HUB AND AXLE ASSEMBLY

This invention relates generally to wheel, hub and axle assemblies and is particularly concerned with a hub and axle assembly for balloon-tired wheels.

With the increasing popularity of vehicles for use off the road, on sand, snow or in swamps and mud, the use of balloon tires for such vehicles is rapidly increasing. Balloon tires are particularly useful since they do not get hard as in the case with conventional tires, and can thus conform to irregular surfaces and are not limited in their use to smooth, hard surfaces. Balloon tires are characterized by the fact that the pressure in the tire remains substantially constant with the addition of air, the tire merely increasing in size with the increased air. The tire thus remains soft and pliable and can provide traction under conditions not suitable for conventional tires such as over snow, sand and muddy or swampy areas. Vehicles using balloon tires have thus come into increased use in recent years, both as recreation and as utility vehicles.

Most balloon tires are manufactured with a hub having a cylindrical opening extending through the tire for attachment to a drive shaft or axle. The manufacturer of the vehicle, or the owner of such a vehicle, has to connect the drive shaft or axle of the vehicle to the tubular hub portion or cylindrical opening in the hub. This is usually done by connecting the axle to a transverse connector secured to the inner wall of the cylindrical opening. The principle weakness of such type connections is due primarily to fatigue failure of the mounting flange or connector due to the concentration of torsional stresses at the connection between the axle and hub.

It is therefore an object of this invention to provide an axle and hub assembly particularly suitable for balloon tires having a hub with a cylindrical opening therein wherein a plastic load-distributing and torque-transmitting member is bonded to the inner surface of the cylindrical opening and is secured against rotation relative to the axle for transmitting torsional forces between the axle and hub.

Another object of this invention lies in the provision of a hub and axle assembly particularly suitable for balloon tires wherein the axle is provided with radially projecting ribs which are interlocked with grooves in a plastic torque-transmitting member bonded to the inner surface of the hub.

The foregoing, and other objects, are achieved according to the present invention by an assembly including a hub having a cylindrical opening with a transverse connector mounted therein and secured to the inner wall thereof. An axle having an end portion received in the hub is secured to the connector, and a load-distributing and torque-transmitting member of organic polymeric material such as urethane is received in the cylindrical opening of the hub and is bonded to the inner wall thereof. Formed in the torque-transmitting member is an axial opening receiving the end portion of the axle, and the torque-transmitting member is secured to the axle against relative rotation whereby torsional forces are transmitted between the axle and hub through the torque-transmitting member.

The axle and plastic torque-transmitting member are secured against rotation by interlocking ribs and grooves. More specifically, ribs on the end of the axle are interlocked with grooves formed in the torque-transmitting member. The axle is of circular cross section and the ribs comprise axially extending elongated rods welded onto the end portion of the axle at circumferentially spaced locations. The rods are formed with axially extending tapped openings for receiving fasteners to secure the axle to the connector member, and the axial opening in the plastic torque-transmitting member includes a circular axial passage receiving the circular portion of the axle and grooves extending radially from the circular axial passage, each groove receiving one of the rods.

Other objects, advantages and features of the invention will become apparent from the following description taken in connection with the accompanying drawings in which:

FIG. 1 is an elevational view of a portion of a vehicle supported on balloon tires having a hub and axle assembly according to the present invention;

FIG. 2 is a sectional view taken on lines 2-2 of FIG. 1; and

FIGS. 3 and 4 are views taken along lines 3-3 and 4-4, respectively, of FIG. 2.

In FIG. 1, reference numeral 2 collectively designates a utility vehicle having three sets of ground support members in the form of balloon tires 4 having hub portions 6 including a cylindrical opening defined by a tubular member 8 (FIG. 2). A transverse connector 10 is mounted in the cylindrical opening and is secured to the inner wall thereof. The connector 10 has an axially extending cylindrical flange 12 which is engaged with the inner wall of the cylindrical opening of the tubular member 8 and is secured thereto by welding or other conventional means.

Received in the cylindrical opening is an axle 14 which is secured to the connector 10. Axle 14 is also received in a plastic load-distributing and torque-transmitting member 16 adhesively bonded to the inner wall of the cylindrical opening of tubular member 8 and secured to the axle 14 against relative rotation with respect thereto whereby torsional forces are transmitted between the axle and hub through the load-distributing and torque-transmitting member 16. The torque-transmitting member 16 comprises a cylindrical body of plastic or organic polymeric material such as urethane, nylon, or the like, having a reduced diameter portion 17 at one end received in the flange 12 of connector 10.

The torque-transmitting member 16 and axle 14 are secured together against rotation by interlocking ribs and grooves between the end portion of the axle and the axial opening of the torque-transmitting member which receives the axle 14. Ribs in the form of axially extending elongated rods 18 are secured to the axle by welding as indicated at 19. In the drawings, three such rods are welded to the axle 14 at circumferentially spaced locations on the axle. Specifically, in the illustrated embodiment, the three rods 18 are located 60° apart around the circumference of the axle 14 and are substantially equally spaced from the axis of the axle. Each rod 18 is provided with an axially extending tapped or threaded opening 20 for receiving a bolt or similar fastener 22 which extends through openings 24 in the connector 10 to secure the axle to the hub against axial movement through the connector 10. Washers 26 are interposed between the heads of bolt 22 and the beaded openings 24.

The torque-transmitting member 16 is formed with an axial passage 28 of circular cross section for receiving the axle 14, and grooves 30 extend radially from the circumference of the circular passage 28 for receiving the ribs or rods 18. As shown in FIG. 4, each of the grooves 30 is of U-shaped cross section with a circular base portion having substantially the same diameter as the rods 18 to prevent relative rotation between the plastic member and axle.

The torque-transmitting member 16 is formed in a mold and cured. The member is then inserted into the cylindrical opening of the tubular member 8 and bonded to the inner wall thereof by a suitable bonding agent. Organic polymeric materials such as urethane and nylon are suitable for forming the torque-transmitting member. The use of the plastic torque-transmitting member provides an efficient solution to the problem of concentration of torsional stresses and resulting fatigue failure at conventional fasteners.

While a specific form of the invention is illustrated in the accompanying drawings and described in the foregoing specification, it should be understood that the invention is not limited to the exact construction shown. To the contrary various alterations in the construction and arrangement of parts, all falling within the scope and spirit of the invention, will become apparent to those skilled in the art.

The embodiments of the invention in which I claim exclusive property or privilege is claimed are defined as follows:

1. A hub and axle assembly comprising: a hub having a cylindrical tubular portion with a transverse connector mounted therein and secured to the inner wall thereof; a (plurality) of openings in said connector; and axle received in said tubular member; a plurality of axially extending elongated rods mounted on the outer surface of the axle at circumferentially spaced locations; a fastener extending through each of said openings and each engaging one of said rods to secure said axle to said hub; and a plastic load-distributing and torque-transmitting member bonded to the inner wall of said tubular portion with an axial passage receiving said axle; and a plurality of grooves extending radially from said axial passage each receiving one of said rods to nonrotatably interlock the axle with the load-distributing and torque-transmitting member.

2. A hub and axle assembly as claimed in claim 1 wherein each of said rods is of circular cross section, and said grooves are of U-shaped cross section with a circular base portion having substantially the same diameter as the diameter of said rods so as to closely receive the respective rod.

3. A hub and axle assembly as claimed in claim 2 wherein said connector has an axially extending cylindrical flange nonrotatably secured to the inner wall of the hub, and wherein said plastic load-distributing and torque-transmitting member comprises a cylindrical body having a reduced diameter portion at one end received in the cylindrical flange of said connector.

4. A hub and axle assembly including: a hub having a cylindrical opening with a transverse connector mounted therein and secured to the inner wall thereof; an axle having an end portion received in said hub and secured to said connector; a plastic torque-transmitting member coaxially received in said cylindrical opening having a cylindrical outer surface bonded to the inner cylindrical wall of said cylindrical opening with an axial opening receiving the end portion of said axle; means securing said axle and torque-transmitting member against relative rotation whereby at least some torsional forces are transmitted between the axle and hub through said torque-transmitting member to prevent concentration of torsional stresses at said connector; said means securing said axle and torque-transmitting member against rotation comprising interlocking ribs and grooves between the end portion of the axle and the axial opening of the torque-transmitting member, wherein ribs on the axle are interlocked with grooves formed in the torque-transmitting member, said axle being of circular cross section and said ribs comprising axially extending elongated members on the end portion of the axle at circumferentially spaced locations; and wherein said axially extending elongated members each comprises a rod welded to the end portion of said axle.

5. A hub and axle assembly as claimed in claim 4, wherein axially extending fasteners secure each of said rods to said connector for securing the axle to the connector.

6. A hub and axle assembly as claimed in claim 5 wherein the axial opening in said torque-transmitting member comprises a circular axial passage receiving the circular portion of the end portion of said axle with grooves extending radially from said circular passage each receiving one of said rods.